May 19, 1964  R. G. SMITH  3,133,597
LAWN EDGING APPARATUS
Filed June 25, 1962

INVENTOR.
ROBERT G. SMITH
BY Hauke & Hauke
ATTORNEYS

United States Patent Office 3,133,597
Patented May 19, 1964

3,133,597
LAWN EDGING APPARATUS
Robert G. Smith, 31643 Delaware, Livonia, Mich.
Filed June 25, 1962, Ser. No. 204,977
6 Claims. (Cl. 172—14)

The present invention relates to landscaping maintenance equipment and more particularly to a lawn edging device adapted for clamping to the wheel of a lawn mower for rotation therewith.

In the maintenance and care of lawns it is often desirable to cut away a portion of the sod closely adjacent a sidewalk or flower or shrubbery bed. Heretofore devices have been provided for performing this function. However, such lawn edgers as have been heretofore provided are expensive and difficult to use.

It is an object of the present invention to provide a simply constructed lawn edger by providing such a device adapted to be clamped to the wheel of a mower or the like.

It is another object of the present invention to provide an easily operated lawn edger by providing a sharpened disc and means for readily adjustably clamping the disc to the wheel of a lawn mower or the like for rotation therewith.

Figure 1:
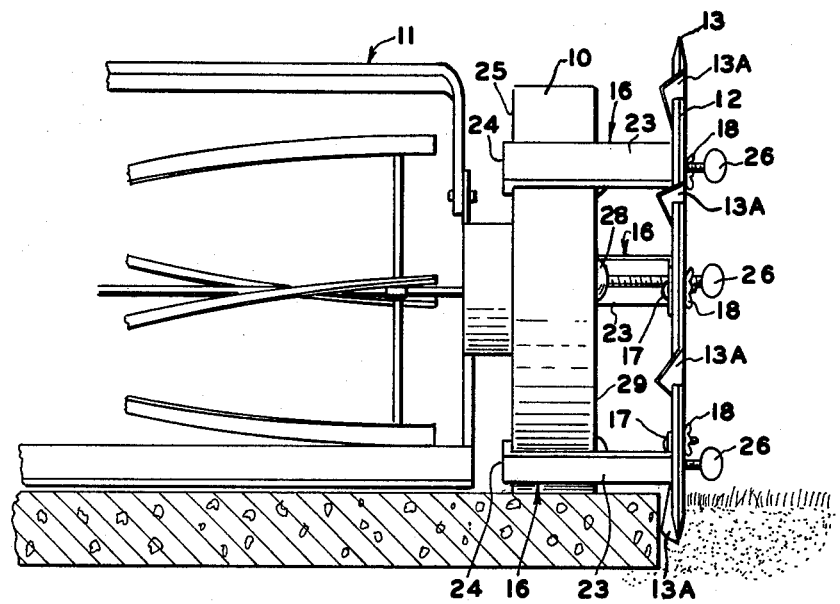
Figure 2:
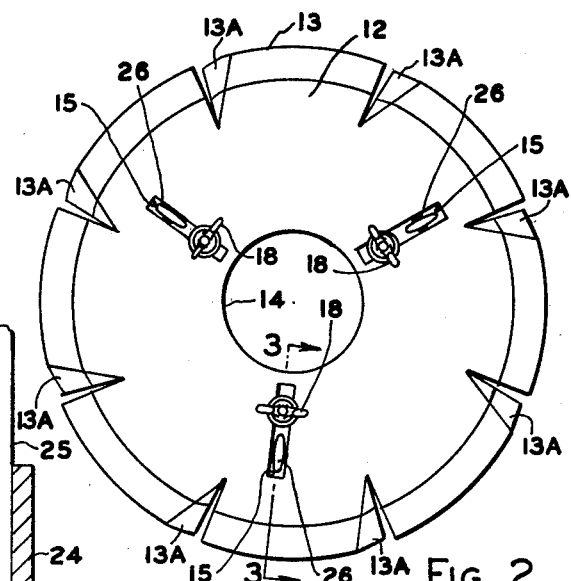
Figure 3:
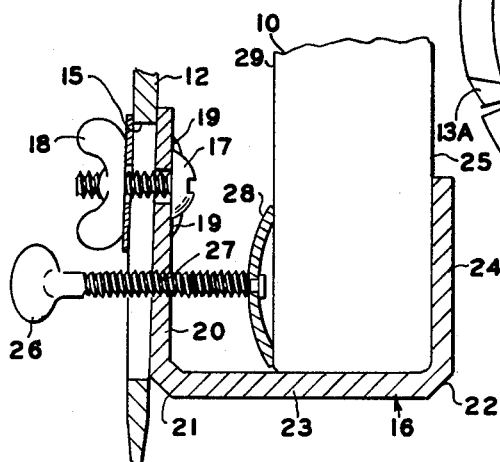

Other objects and advantages will readily occur to one skilled in the art upon reference to the following drawings in which like reference characters refer to like parts throughout the several views and in which FIG. 1 is a front elevational view of a preferred embodiment of the present invention showing it clamped to the wheel of a lawn mower, FIG. 2 is a side elevational view of the preferred device shown in FIG. 1, and FIG. 3 is a fragmentary cross sectional view taken substantially on line 3—3 of FIG. 2.

Now referring to the drawings for a more detailed description of the present invention, a preferred device is shown clamped to a wheel 10 of a lawn mower 11.

The preferred edging device comprises a disc 12 having a sharpened outer periphery 13 and a central opening 14. Annularly spaced cutting tooth members 13A are displaced from the edge as illustrated. The radius of the disc 12 is somewhat larger than the radius of any conventional mower wheel 10. The disc 12 is provided with a plurality of annularly spaced radially extending slots 15 as can best be seen in FIGS. 2–3.

A bracket 16 is radially adjustably carried in each of the slots 15 by means of a bolt 17 and a wing nut 18. The bolt 17 may be welded to the bracket 16 as illustrated in FIG. 3 at 19. The bracket 16 is substantially C-shaped in cross section and is provided with an elongated base portion 20 which engages the disc 12. The bracket 16 is bent as at 21 and return bent as at 22 to provide a portion 23 extending across and engaging a portion of the outer periphery of the wheel 10 and a flange portion 24 engaging the inner sidewall 25 of the wheel 10.

A screw member 26 extends through the slot 15 and a threaded opening 27 in the base portion 20 of the bracket 16 and has a clamp element 28 swivelingly carried on its inner end and engageable with the outer sidewall 29 of the wheel 10.

The elongated slots 15 permit the edging device to be carried on many different size wheels. All that is necessary is that the radius of the disc 12 be larger than the radius of the wheel 10. The central opening 14 permits the device to be attached to wheels having outwardly extending axles or hubs. The screw member 26 is tightened against the sidewall 29 clamping the wheel between the clamp element 28 and the flange 24, and the disc 12 will thus rotate with the wheel 10. The wing nuts 18 provide a means of easily detaching the assembly when the lawn edging has been completed.

Although the device has been described as being attached to the wheel of a lawn mower, it is apparent that the wheel of other equipment can be used as well. It is only necessary that the equipment have sufficient weight to embed the disc 12 in the ground as it moves.

Preferably, it will be used with a power mower, which has sufficient weight and can be tipped back on the roller if necessary to decrease load, slowing the forward motion of the mower while increasing the rotary cutting speed of the disc 12.

Although I have described but one embodiment of the present invention, it is apparent that other changes and modifications may be made without departing from the spirit of the invention or the scope of the appended claims.

I claim:

1. A device to be attached to a wheel and for edging a lawn or the like comprising a disc having a sharpened outer peripheral edge and a plurality of annularly spaced radially extending slots, and means for removably clamping said disc to said wheel for rotation therewith said means comprising
   (a) a plurality of brackets each having a portion extending across the tread of said wheel, an end portion bent to engage the inner sidewall of said wheel and an opposite end portion bent to engage the engage the inner surface of said disc,
   (b) means carried by said brackets and extending through said slots to radially adjustably mount said brackets to said disc whereby said brackets can be radially adjusted with respect to said disc to accommodate different size wheels, and
   (c) clamping means extending through said slots and carried by said brackets to be movable into engagement with the outer sidewall of said wheel whereby said wheel is sandwiched between said clamping means and said sidewall engaging portions of said brackets.

2. The device as defined in claim 1 and in which a plurality of annularly spaced tooth portions are laterally displaced from said outer peripheral edge.

3. A lawn edging device for use in combination with a lawn mower having a wheel, said device comprising
   (a) a disc having a sharpened outer peripheral edge,
   (b) a plurality of spaced radially extending slots provided in said disc,
   (c) a plurality of substantially C-shaped bracket members and means extending respectively through each of said slots for radially adjustably mounting said bracket members to said disc,
   (d) said bracket members each having a portion extending across and engaging the outer periphery of said wheel,
   (e) said bracket members each being bent to form a flange engaging the inner sidewall of said wheel, and
   (f) a screw member extending through each of said slots and carried by said brackets in a position to be tightened into engagement with the outer sidewall of said wheel whereby as said screw members are tightened said disc is clamped to said wheel in a position spaced from and substantially coaxial with said wheel for rotation therewith.

4. In combination with a lawn mower or the like having a wheel, a device for edging a lawn comprising
   (a) a disc having a radius larger than the radius of said wheel and provided with a sharpened outer peripheral edge,
   (b) said disc being provided with a plurality of spaced radially extending slots,
   (c) a plurality of bracket members and means extending respectively through each of said slots to radially adjustably mount said bracket members to said disc whereby said brackets can be radially adjusted with respect to said disc to fit different size wheels, (d) said bracket members each having a flange portion engaging the inner sidewall of said wheel, and (e) said bracket members each being provided with a threaded perforation and a screw member extending respectively through each of said slots and carried in said threaded perforations whereby upon tightening said screw members are brought into engagement with the outer side wall of said wheel to clamp said disc to said wheel.

5. The device as defined in claim 4 and in which said bracket mounting means comprises (a) a bolt member secured to each of said bracket members and each having a threaded shank portion extending respectively through said slots, (b) a nut member received by said shank portion to clamp said disc to said bracket members.

6. In combination with a lawn mower or the like having a wheel a device for edging a lawn comprising, (a) a disc having a radius larger than the radius of said wheel, (b) said disc being provided with a sharpened outer peripheral edge, a plurality of annularly spaced tooth portions laterally displaced from said outer peripheral edge and a plurality of annularly spaced radially extending slots, (c) a plurality of substantially C-shaped bracket members each having a portion extending across the tread of said wheel, an end portion engaging the inner side wall of said wheel and an opposite portion engaging said disc, (d) each of said brackets being provided with a bolt member having a shank portion extending respectively through said slots and a nut member received by said shank portion to radially adjustably clamp said brackets to said disc whereby said brackets can be radially adjusted with respect to said disc to accommodate different size wheels, (e) a screw member extending respectively through each of said slots and carried by said brackets in a position to engage the outer sidewall of said wheel to clamp said disc in a position coaxial with and spaced from said wheel.

References Cited in the file of this patent

UNITED STATES PATENTS

| | | |
|---|---|---|
| 1,010,260 | Hill | Nov. 28, 1911 |
| 1,732,308 | Livingston | Oct. 22, 1929 |
| 2,036,820 | Murdock | Apr. 7, 1936 |
| 2,185,659 | Chernow | Jan. 2, 1940 |
| 3,068,925 | Stephens | Dec. 18, 1962 |

FOREIGN PATENTS

| | | |
|---|---|---|
| 397,624 | Great Britain | Aug. 31, 1933 |